United States Patent
Kageyama et al.

(10) Patent No.: US 11,881,740 B2
(45) Date of Patent: Jan. 23, 2024

(54) BACKUP POWER SUPPLY SYSTEM FOR SHIFT-BY-WIRE SYSTEM AND NON-TRANSITORY STORAGE MEDIUM

(71) Applicants: PANASONIC INTELLECTUAL PROPERTY MANAGEMENT CO., LTD., Osaka (JP); HONDA MOTOR CO., LTD., Tokyo (JP)

(72) Inventors: Youichi Kageyama, Osaka (JP); Hiroki Kato, Saitama (JP)

(73) Assignees: PANASONIC INTELLECTUAL PROPERTY MANAGEMENT CO., LTD., Osaka (JP); HONDA MOTOR CO., LTD., Tokyo (JP)

( * ) Notice: Subject to any disclaimer, the term of this patent is extended or adjusted under 35 U.S.C. 154(b) by 335 days.

(21) Appl. No.: 17/431,022

(22) PCT Filed: Dec. 24, 2019

(86) PCT No.: PCT/JP2019/050449
§ 371 (c)(1),
(2) Date: Aug. 13, 2021

(87) PCT Pub. No.: WO2020/166210
PCT Pub. Date: Aug. 20, 2020

(65) Prior Publication Data
US 2022/0123585 A1    Apr. 21, 2022

(30) Foreign Application Priority Data
Feb. 15, 2019    (JP) .................................. 2019-025634

(51) Int. Cl.
*H02J 9/06*    (2006.01)
*H02J 7/34*    (2006.01)

(52) U.S. Cl.
CPC .............. *H02J 9/061* (2013.01); *H02J 7/342* (2020.01); *H02J 2207/10* (2020.01)

(58) Field of Classification Search
CPC ........ H02J 9/061; H02J 7/342; H02J 2207/10; H02J 9/06; H02J 7/34
See application file for complete search history.

(56) References Cited

U.S. PATENT DOCUMENTS

| | | |
|---|---|---|
| 2012/0309590 A1 | 12/2012 | Kanai et al. |
| 2016/0109022 A1 | 4/2016 | Uryu et al. |
| 2019/0165602 A1 | 5/2019 | Morita |

FOREIGN PATENT DOCUMENTS

| | | |
|---|---|---|
| JP | 2008-133931 A | 6/2008 |
| JP | 2016-080078 A | 5/2016 |

(Continued)

OTHER PUBLICATIONS

Internatonal Search Report and Written Opinion issued in International Patent Application No. PCT/JP2019/050449, dated Mar. 24, 2020; with partial English translation.

(Continued)

*Primary Examiner* — Robert L Deberadinis
(74) *Attorney, Agent, or Firm* — Rimon, P.C.

(57) ABSTRACT

A backup power supply system for a shift-by-wire system includes a power storage unit and a control unit. Power storage unit supplies power to a shift-by-wire system. When at least one of a first condition or a second condition is satisfied, control unit outputs an instruction signal, instructing that a shift range of an automatic transmission should be changed into a parking range, to shift-by-wire system. First condition requires that the duration for which output voltage of the mains power supply remains equal to or less than a first voltage threshold value should be longer than a first duration. Second condition requires that the duration for which the output voltage of the mains power supply remains (Continued)

equal to or less than a second voltage threshold value, smaller than the first voltage threshold value, should be longer than a second duration which is shorter than the first duration.

7 Claims, 4 Drawing Sheets

(56) References Cited

FOREIGN PATENT DOCUMENTS

| | | |
|---|---|---|
| JP | 2016-094949 A | 5/2016 |
| JP | 2017-052473 A | 3/2017 |
| JP | 2018-105420 A | 7/2018 |
| WO | 2011/101973 A1 | 8/2011 |
| WO | 2018/016277 A1 | 1/2018 |

OTHER PUBLICATIONS

International Search Report and Written Opinion issued in International Patent Application No. PCT/JP2019/050449, dated Mar. 24, 2020; with partial English translation.

FIG. 2
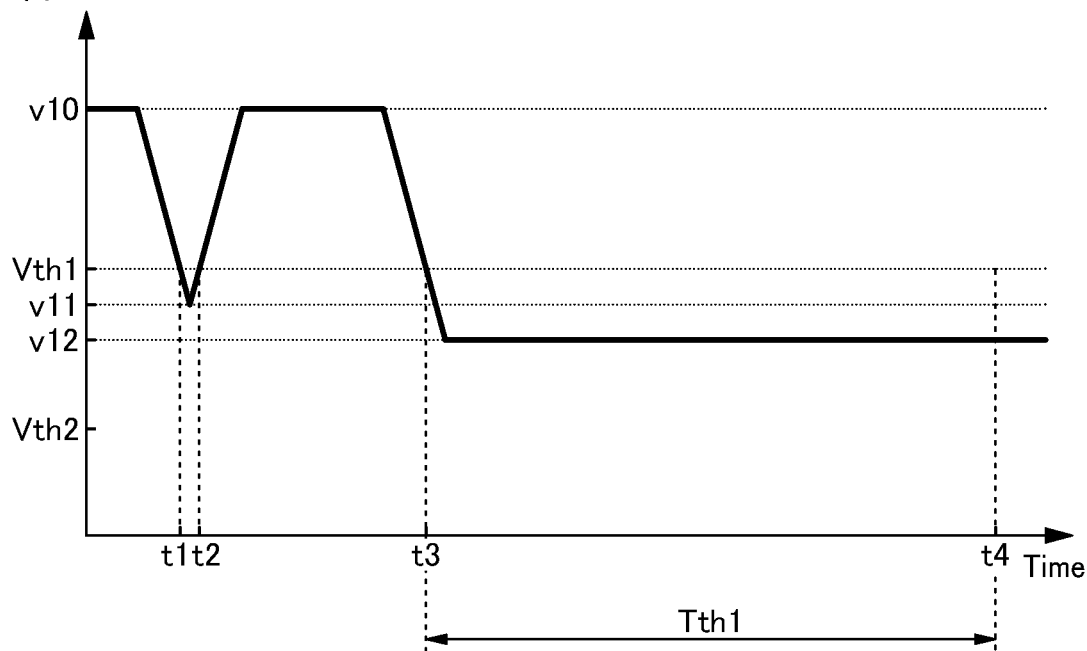
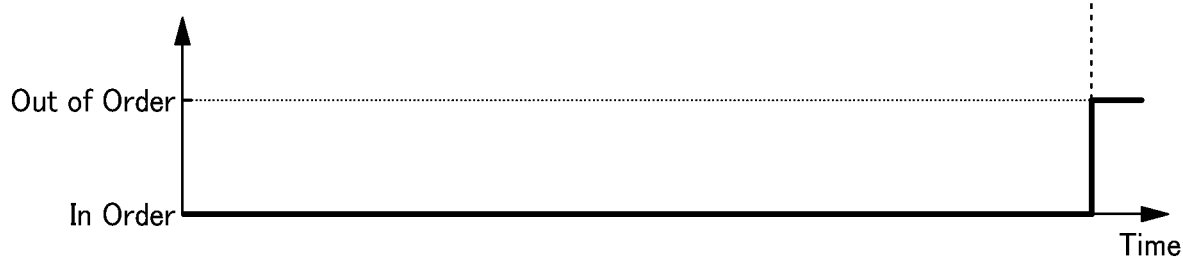

BACKUP POWER SUPPLY SYSTEM FOR SHIFT-BY-WIRE SYSTEM AND NON-TRANSITORY STORAGE MEDIUM

CROSS-REFERENCE OF RELATED APPLICATIONS

This application is the U.S. National Phase under 35 U.S.C. § 371 of International Patent Application No. PCT/JP2019/050449, filed on Dec. 24, 2019, which in turn claims the benefit of Japanese Application No. 2019-025634, filed on Feb. 15, 2019, the entire disclosures of which Applications are incorporated by reference herein.

TECHNICAL FIELD

The present disclosure generally relates to a backup power supply system for a shift-by-wire system and a non-transitory storage medium. More particularly, the present disclosure relates to a backup power supply system for supplying power to a shift-by-wire system and a program for controlling the backup power supply system for a shift-by-wire system.

BACKGROUND ART

Patent Literature 1, for example, discloses an onboard power supply device including a main battery (serving as a mains power supply) and an auxiliary battery (serving as a power storage unit). The onboard power supply device supplies power from the auxiliary battery to an actuator for shift-by-wire transmission (which forms part of a shift-by-wire system) when the main battery has lost power supply capability.

When the main battery goes out of order, the shift-by-wire system is supplied with power from the power storage unit, instead of the mains power supply. Since the shift-by-wire system is supplied with power continuously, the shift-by-wire system is unable to detect the working conditions of the mains power supply. This prevents the shift-by-wire system from changing the automatic transmission into a shift range depending on whether the mains power supply is in good working order or out of order.

CITATION LIST

Patent Literature

Patent Literature 1: JP 2017-52473 A

SUMMARY OF INVENTION

In view of the foregoing background, it is therefore an object of the present disclosure to provide a backup power supply system for a shift-by-wire system having the ability to change a shift range of an automatic transmission depending on whether the mains power supply is in good working order or out of order and a non-transitory storage medium recording a program for controlling such a backup power supply system.

A backup power supply system for a shift-by-wire system according to an aspect of the present disclosure includes a power storage unit and a control unit. When a mains power supply that supplies power to the shift-by-wire system goes out of order, the power storage unit supplies power to the shift-by-wire system. When at least one of a first condition or a second condition is satisfied, the control unit outputs an instruction signal to the shift-by-wire system. The instruction signal instructs that a shift range of an automatic transmission should be changed into a parking range. The first condition requires that duration for which output voltage of the mains power supply remains equal to or less than a first voltage threshold value should be longer than a first duration. The second condition requires that duration for which the output voltage of the mains power supply remains equal to or less than a second voltage threshold value should be longer than a second duration. The second voltage threshold value is smaller than the first voltage threshold value. The second duration is shorter than the first duration.

A non-transitory storage medium according to another aspect of the present disclosure is a non-transitory storage medium recording a program for controlling a backup power supply system for a shift-by-wire system. When a mains power supply that supplies power to the shift-by-wire system goes out of order, the backup power supply system supplies power to the shift-by-wire system. The control program is designed to cause a computer system to perform output processing. The output processing includes outputting an instruction signal to the shift-by-wire system when at least one of a first condition or a second condition is satisfied. The instruction signal instructs that a shift range of an automatic transmission should be changed into a parking range. The first condition requires that duration for which output voltage of the mains power supply remains equal to or less than a first voltage threshold value should be longer than a first duration. The second condition requires that duration for which the output voltage of the mains power supply remains equal to or less than a second voltage threshold value should be longer than a second duration. The second voltage threshold value is smaller than the first voltage threshold value. The second duration is shorter than the first duration.

BRIEF DESCRIPTION OF DRAWINGS

FIG. 2 illustrates how the backup power supply system for a shift-by-wire system operates;

DESCRIPTION OF EMBODIMENTS

Figure 1:
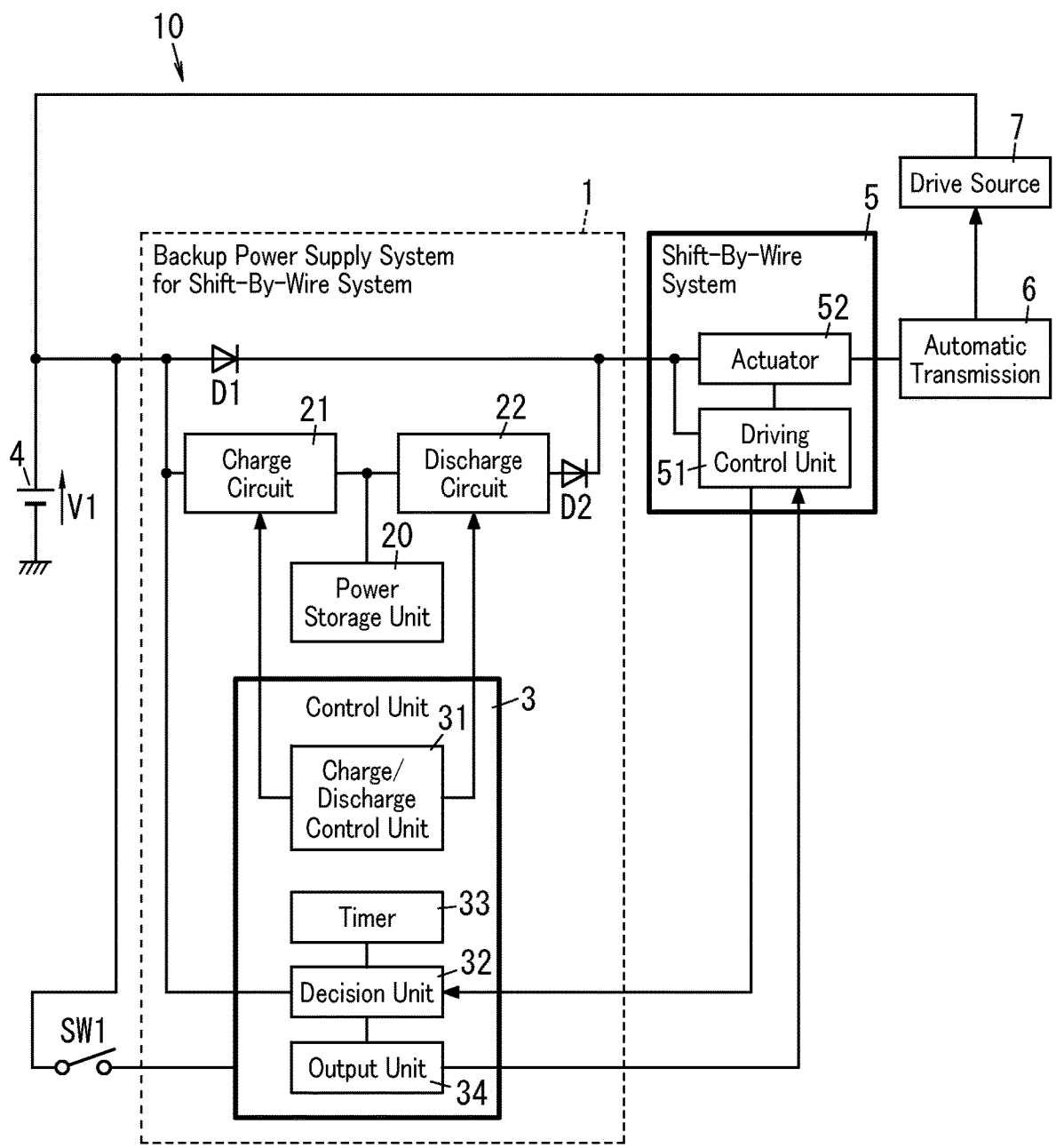
FIG. 1 is a block diagram of a backup power supply system for a shift-by-wire system according to an exemplary embodiment.

Note that the embodiment and its variations to be described below are only examples of the present disclosure and should not be construed as limiting. Rather, the exemplary embodiment and variations to be described below may be readily modified in various manners depending on a design choice or any other factor without departing from a true spirit and scope of the present disclosure.

(1) Overview

A backup power supply system 1 for a shift-by-wire system (hereinafter simply referred to as a "backup power supply system 1") according to an exemplary embodiment will be described with reference to FIG. 1.

The backup power supply system 1 for a shift-by-wire system according to this embodiment supplies, when a mains power supply 4 goes out of order, power to the shift-by-wire system 5 in place of the mains power supply 4. This allows, even when the supply of power from the mains power supply 4 has stopped, the shift-by-wire system 5 to operate continuously with the power supplied from the backup power supply system 1.

The backup power supply system 1 according to this embodiment may be used in, for example, vehicles (four-wheeled vehicles). Each vehicle includes a drive system 10 and a vehicle body on which the drive system 10 is mounted. The drive system 10 includes the backup power supply system 1, the mains power supply 4, the shift-by-wire system 5, an automatic transmission 6, and a drive source 7. The drive source 7 may be an engine to be driven using, for example, gasoline as a fuel. The mains power supply 4 is a battery (such as a lead acid battery) installed in the vehicle and is configured to supply power to the shift-by-wire system 5 and the drive source 7. Specifically, the mains power supply 4 is configured to supply power to a cell motor of the drive source 7.

The shift-by-wire system 5 is a system for electrically changing the shift range of the automatic transmission 6. The shift-by-wire system 5 includes a driving control unit 51 and an actuator 52. The driving control unit 51 controls driving of the actuator 52 by outputting a control signal to the actuator 52 according to the position of a shift lever turned by the driver of the vehicle. The actuator 52 is configured to change the shift range of the automatic transmission 6 in accordance with the control signal from the driving control unit 51.

The shift ranges of the automatic transmission 6 include a parking range (P range), a reverse range (R range), a neutral range (N range), and a drive range (D range). The parking range is used to park the vehicle. The drive range is used to propel the vehicle forward. The reverse range is used to reverse the vehicle.

The shift-by-wire system 5 is configured to operate with the power supplied from either the mains power supply 4 or the backup power supply system 1.

When the mains power supply 4 is in good working order, power is supplied from the mains power supply 4 to the shift-by-wire system 5. On the other hand, when the mains power supply 4 goes out of order, power is supplied from the backup power supply system 1 to the shift-by-wire system 5. As used herein, a state where the mains power supply 4 is out of order refers to a state where the output voltage of the mains power supply 4 has decreased to a voltage threshold value or less due to, for example, a failure or deterioration of the mains power supply 4, i.e., a power shortage state.

If the mains power supply 4 is out of order, power is supplied from the backup power supply system 1 to the shift-by-wire system 5, thus allowing the shift-by-wire system 5 to change the shift range of the automatic transmission 6.

Also, when the mains power supply 4 goes out of order, the backup power supply system 1 according to this embodiment transmits an instruction signal, instructing that the shift range of the automatic transmission 6 should be changed into a parking range, to the shift-by-wire system 5. This allows the car to be brought to a halt when the mains power supply 4 goes out of order.

(2) Configuration

As shown in FIG. 1, the backup power supply system 1 according to this embodiment includes a power storage unit 20, a charge circuit 21, a discharge circuit 22, a control unit 3, a first diode D1, and a second diode D2.

The power storage unit 20 may be implemented as, for example, an electrical double layer capacitor (EDLC). The power storage unit 20 is electrically connected to the mains power supply 4 via the charge circuit 21. The power storage unit 20 is also electrically connected to the shift-by-wire system 5 via the discharge circuit 22 and the second diode D2. The power storage unit 20 is charged with the power supplied from the mains power supply 4 via the charge circuit 21. Also, when the mains power supply 4 goes out of order, the power storage unit 20 supplies power to the shift-by-wire system 5 via the discharge circuit 22 and the second diode D2.

The charge circuit 21 may be implemented as, for example, a voltage step-down circuit. The charge circuit 21 is electrically connected to the mains power supply 4. The charge circuit 21 charges the power storage unit 20 by stepping-down the output voltage V1 of the mains power supply 4 and outputting the stepped down voltage to the power storage unit 20. The charge circuit 21 has its operation controlled by a charge/discharge control unit 31 of the control unit 3.

The discharge circuit 22 may be implemented as, for example, a voltage step-up circuit (booster circuit). The discharge circuit 22 is electrically connected to the shift-by-wire system 5 via the second diode D2. The second diode D2 has its anode electrically connected to the voltage step-up circuit and its cathode electrically connected to the driving control unit 51 and actuator 52 of the shift-by-wire system 5. The discharge circuit 22 steps up the output voltage of the power storage unit 20 and outputs the stepped-up voltage to the driving control unit 51 and actuator 52 of the shift-by-wire system 5. This allows power to be supplied from the power storage unit 20 to the driving control unit 51 and actuator 52 of the shift-by-wire system 5. The discharge circuit 22 has its operation controlled by the charge/discharge control unit 31 of the control unit 3.

The first diode D1 is electrically connected between the mains power supply 4 and the shift-by-wire system 5. The first diode D1 has its anode electrically connected to the mains power supply 4 and its cathode electrically connected to the driving control unit 51 and actuator 52 of the shift-by-wire system 5. The first diode D1 is connected to the charge circuit 21, the power storage unit 20, and the discharge circuit 22 in parallel.

The backup power supply system 1 according to this embodiment supplies power to the driving control unit 51 and actuator 52 of the shift-by-wire system 5 via the same route. However, this is only an example of the present disclosure and should not be construed as limiting. Alternatively, the backup power supply system 1 may also be configured to supply power to the driving control unit 51 and the actuator 52 via two different routes. In that case, the voltages applied to the driving control unit 51 and the actuator 52 may have mutually different voltage values.

The control unit 3 is a computer system (such as a microcontroller) including, as major constituent elements thereof, a processor and a memory. The control unit 3 performs the functions of the charge/discharge control unit 31, the decision unit 32, a timer 33, and an output unit 34 by making the processor execute a program stored in the memory. The program may be stored in advance in the memory, downloaded via a telecommunications line such as the Internet, or distributed after having been stored in a storage medium such as a memory card. The control unit 3 is configured to be started when an ignition switch SW1 turns ON.

The charge/discharge control unit 31 controls the operation of the charge circuit 21 and the discharge circuit 22.

The charge/discharge control unit 31 monitors the output voltage of the power storage unit 20. When finding the output voltage of the power storage unit 20 less than a predetermined value, the charge/discharge control unit 31 controls the charge circuit 21 such that a constant current is supplied to the power storage unit 20. On the other hand, when finding the output voltage of the power storage unit 20 equal to or greater than the predetermined value, the charge/discharge control unit 31 controls the charge circuit 21 such that a constant voltage is applied to the power storage unit 20. That is to say, the charge/discharge control unit 31 controls the charge circuit 21 such that the power storage unit 20 is charged with a constant current when the output voltage of the power storage unit 20 is less than the predetermined value and that the power storage unit 20 is charged with a constant voltage when the output voltage of the power storage unit 20 is equal to or greater than the predetermined value.

In addition, the charge/discharge control unit 31 controls the discharge circuit 22 such that the discharge circuit 22 outputs a predetermined voltage. The voltage value of the output voltage of the discharge circuit 22 is set at such a voltage value that keeps the shift-by-wire system 5 in good working order. When the mains power supply 4 is in good working order, the voltage value of the output voltage V1 of the mains power supply 4 is greater than the voltage value of the output voltage of the discharge circuit 22. In other words, the voltage value of the output voltage of the discharge circuit 22 is less than the voltage value of the output voltage V1 of the mains power supply 4 in good working order. Thus, when the voltage value of the output voltage V1 of the mains power supply 4 becomes less than the voltage value of the output voltage of the discharge circuit 22, the output voltage of the discharge circuit 22 is applied to the shift-by-wire system 5. Thus, when the mains power supply 4 goes out of order, the source of supplying power to the shift-by-wire system 5 switches from the mains power supply 4 to the backup power supply system 1 (more specifically, the power storage unit 20 thereof), thus reducing the chances of the power to be supplied to the shift-by-wire system 5 being cut off instantaneously.

The decision unit 32 determines, based on the output voltage V1 of the mains power supply 4, whether or not the following first and second conditions are satisfied, thereby making a decision whether or not the mains power supply 4 has gone out of order. Specifically, the decision unit 32 determines, based on a result of comparison between the output voltage V1 of the mains power supply 4 and voltage threshold values (namely, a first voltage threshold value Vth1 and a second voltage threshold value Vth2) and duration for which the output voltage V1 remains equal to or less than the voltage threshold values, whether or not the mains power supply 4 has gone out of order. When finding at least one of the following first and second conditions satisfied, the decision unit 32 decides that the mains power supply 4 should be out of order.

The first condition requires that the duration for which the output voltage V1 of the mains power supply 4 remains equal to or less than the first voltage threshold value Vth1 should be longer than a first duration Tth1 (see FIG. 2).

Figure 3:
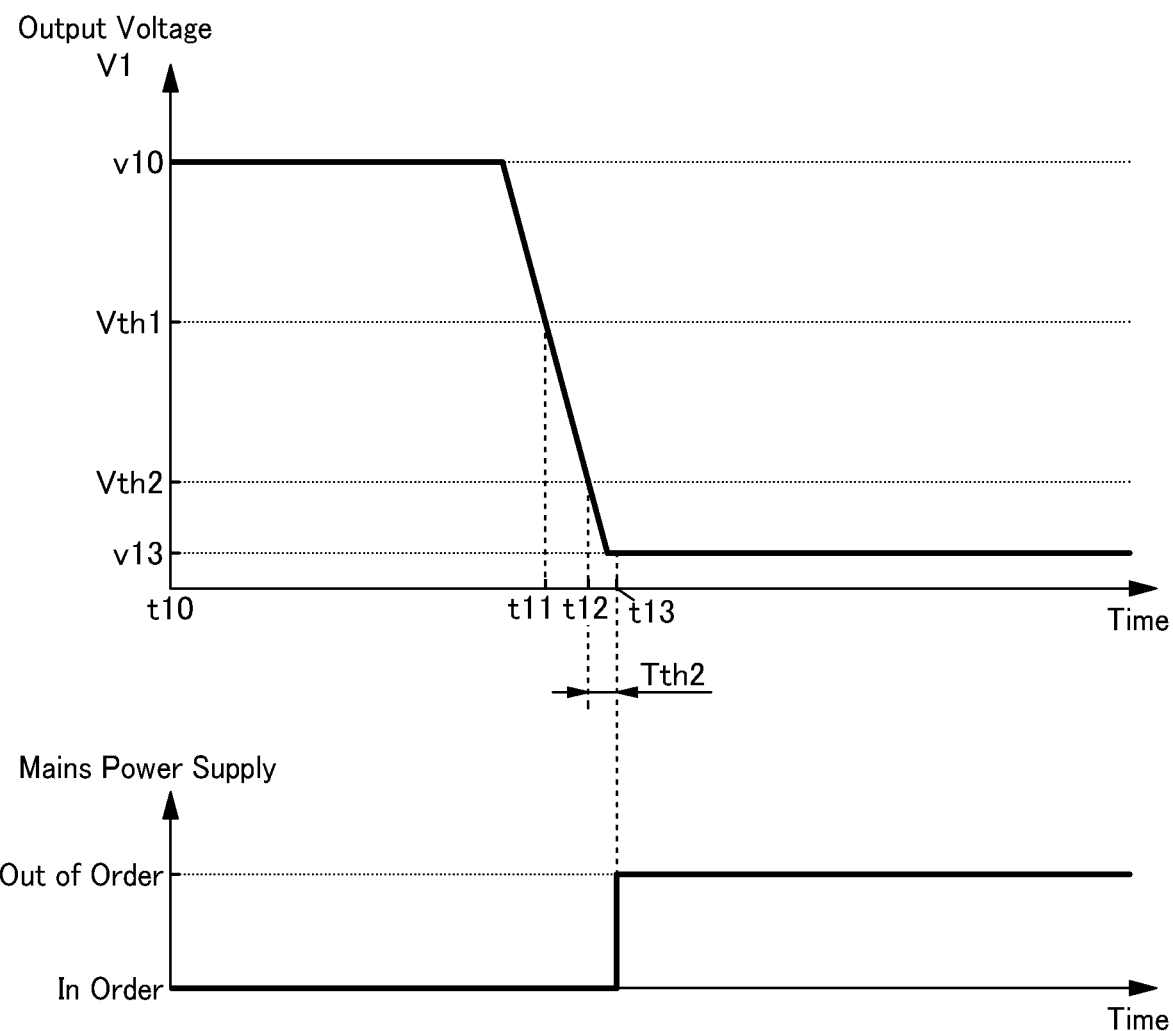
FIG. 3 illustrates how the backup power supply system for a shift-by-wire system operates.

The second condition requires that the duration for which the output voltage V1 of the mains power supply 4 remains equal to or less than the second voltage threshold value Vth2 should be longer than a second duration Tth2 (see FIG. 3).

The second voltage threshold value Vth2 is smaller than the first voltage threshold value Vth1.

In this embodiment, the mains power supply 4 is configured to supply power to the drive source 7. The voltage value of the output voltage V1 may decrease temporarily due to an increase in load when the drive source 7 is started (including a situation where the drive source 7 is started again after idling is stopped). Also, the drive source 7 may be started when the voltage value of the output voltage V1 of the mains power supply 4 is equal to or greater than a lower limit value. In other words, the drive source 7 cannot be started when the voltage value of the output voltage V1 of the mains power supply 4 is less than the lower limit value.

In this embodiment, the first voltage threshold value Vth1 is set at a value greater than the voltage value of the output voltage V1 of the mains power supply 7 which has decreased when the drive source 7 is started. Meanwhile, the second voltage threshold value Vth2 is set at a lower limit value of the output voltage V1 of the mains power supply 4, at or over which the drive source 7 may be started. The first voltage threshold value Vth1 may be a value falling within the range from 5 V to 10 V, for example. The second voltage threshold value Vth2 may be a value falling within the range from 2 V to 5 V, for example. The first voltage threshold value Vth1 is suitably smaller than the voltage value of the output voltage of the discharge circuit 22.

The second duration Tth2 is shorter than the first duration Tth1. The first duration Tth1 may fall within the range from 1 second to 5 seconds, for example. The second duration Tth2 may fall within the range from 0.1 seconds to 0.5 seconds, for example.

The decision unit 32 monitors the output voltage V1 of the mains power supply 4 and compares the voltage value of the output voltage V1 with the first voltage threshold value Vth1 and the second voltage threshold value Vth2.

Based on the result of comparison obtained by the decision unit 32, the timer 33 counts, as a first count value, the duration for which the output voltage V1 remains equal to or less than the first voltage threshold value Vth1 and also counts, as a second count value, the duration for which the output voltage V1 remains equal to or less than the second voltage threshold value Vth2. That is to say, the timer 33 separately counts the duration for which the output voltage V1 remains equal to or less than the first voltage threshold value Vth1 (as the first count value) and the duration for which the output voltage V1 remains equal to or less than the second voltage threshold value Vth2 (as the second count value).

When the output voltage V1 becomes equal to or less than the first voltage threshold value Vth1, the timer 33 starts counting to obtain the first count value. When the output voltage V1 becomes equal to or less than the second voltage threshold value Vth2, the timer 33 starts counting to obtain the second count value. Also, when the output voltage V1 exceeds the first voltage threshold value Vth1, the timer 33 resets the first count value. When the output voltage V1 exceeds the second voltage threshold value Vth2, the timer 33 resets the second count value. That is to say, the timer 33 counts the duration for which the output voltage V1 remains equal to or less than the first voltage threshold value Vth1 and the duration for which the output voltage V1 remains equal to or less than the second voltage threshold value Vth2.

When detecting that the first count value (representing the duration for which the output voltage V1 remains equal to or less than the first voltage threshold value Vth1) obtained by the timer 33 has reached the first duration Tth1, the decision unit 32 decides that the first condition should be satisfied and the mains power supply 4 should have gone out of order. On the other hand, when detecting that the second count value (representing the duration for which the output voltage V1 remains equal to or less than the second voltage threshold value Vth2) obtained by the timer 33 has reached the second duration Tth2, the decision unit 32 decides that the second condition should be satisfied and the mains power supply 4 should have gone out of order. That is to say, when at least one of the first condition or the second condition is satisfied, the decision unit 32 decides that the mains power supply 4 should have gone out of order. Note that even when both the first condition and the second condition are satisfied simultaneously, the decision unit 32 also decides that the mains power supply 4 should have gone out of order.

The output unit 34 outputs, based on the decision made by the decision unit 32, an instruction signal to the shift-by-wire system 5. Specifically, when the decision unit 32 decides that the mains power supply 4 should have gone out of order, the output unit 34 outputs the instruction signal to the driving control unit 51 of the shift-by-wire system 5. The instruction signal is a signal instructing that the shift range of the automatic transmission 6 should be changed into a parking range. The instruction signal may be a pulse width modulation (PWM) signal, for example. That is to say, if the mains power supply 4 has gone out of order to have at least one of the first condition or the second condition satisfied, the output unit 34 outputs the instruction signal, instructing that the shift range of the automatic transmission 6 should be changed into the parking range, to the driving control unit 51 of the shift-by-wire system 5.

When receiving the instruction signal from the backup power supply system 1 (more specifically, the output unit 34 thereof), the driving control unit 51 controls, in accordance with the instruction signal, the actuator 52 such that the shift range of the automatic transmission 6 is changed into the parking range. Under the control of the driving control unit 51, the actuator 52 changes the shift range of the automatic transmission 6 into the parking range. Since the mains power supply 4 has gone out of order in this case, the shift-by-wire system 5 (more specifically, the driving control unit 51 and the actuator 52 thereof) operates with the power supplied from the backup power supply system 1. Changing the shift range of the automatic transmission 6 into the parking range allows the vehicle to be brought to a halt.

Note that if the velocity of the vehicle is equal to or greater than an upper limit value when the instruction signal is received, then the driving control unit 51 suitably waits until the vehicle velocity becomes less than the upper limit value before controlling the actuator 52 such that the shift range is changed into the parking range. This reduces the chances of the shift range of the automatic transmission 6 being changed into the parking range accidentally while the vehicle is running.

In addition, the control unit 3 also acquires shift range information from the shift-by-wire system 5. As used herein, the "shift range information" refers to a piece of information indicating the current shift range of the automatic transmission 6. The driving control unit 51 outputs a signal (such as a PWM signal) including the shift range information to the control unit 3.

If the shift range of the automatic transmission 6 is already in the parking range when the mains power supply 4 goes out of order, then there is no need to output the instruction signal instructing that the shift range of the automatic transmission 6 should be changed into the parking range. In this embodiment, the control unit 3 is configured to, if the shift range of the automatic transmission 6 is in the parking range, refrain from outputting the instruction signal to the shift-by-wire system 5. Specifically, if the shift range of the automatic transmission 6 is in the parking range, the decision unit 32 does not determine whether or not the first condition and the second condition are satisfied, i.e., does not determine whether or not the mains power supply 4 has gone out of order. Thus, if the shift range of the automatic transmission 6 is in the parking range, the output unit 34 does not output the instruction signal to the shift-by-wire system 5.

In this embodiment, if the shift range of the automatic transmission 6 is in the parking range, the decision unit 32 does not determines whether or not the first condition and the second condition are satisfied. Alternatively, the decision unit 32 may also be configured to make no decisions about whether or not the mains power supply 4 has gone out of order. Even so, if the shift range of the automatic transmission 6 is in the parking range, the output unit 34 does not output the instruction signal to the shift-by-wire system 5, either.

Furthermore, the plurality of constituent elements (or functions) of the backup power supply system 1 do not have to be aggregated together in the single housing. Alternatively, those constituent elements (or functions) of the backup power supply system 1 may be distributed in multiple housings. Optionally, at least some functions of the backup power supply system 1 may be implemented as a cloud computing system, for instance. For example, the power storage unit 20 may be provided in either the same housing as, or a different housing from, the control unit 3 and other units, whichever is appropriate.

(3) Exemplary Operations (3.1) First Exemplary Operation

A first exemplary operation of the backup power supply system 1 will be described with reference to FIG. 2.

In FIG. 2, at a point in time t0, the mains power supply 4 is in good working order and the voltage value of the output voltage V1 of the mains power supply 4 is v10. The voltage value v10 is greater than the first voltage threshold value Vth1, the second voltage threshold value Vth2, and the voltage value of the output voltage of the discharge circuit 22 (see FIG. 1).

Suppose the voltage value of the output voltage V1 of the mains power supply 4 has decreased from v10 to v11. The voltage value v11 is less than the first voltage threshold value Vth1 and greater than the second voltage threshold value Vth2. At a point in time t1, the voltage value of the output voltage V1 becomes less than the first voltage threshold value Vth1. Thus, the timer 33 starts, at the point in time t1, counting to obtain the first count value.

In this case, when the voltage value of the output voltage V1 of the mains power supply 4 becomes less than the voltage value of the output voltage of the discharge circuit 22, the output voltage of the discharge circuit 22 is applied to the shift-by-wire system 5. That is to say, the source of supplying power to the shift-by-wire system 5 switches from the mains power supply 4 to the backup power supply system 1 (more specifically, the power storage unit 20 thereof).

After the point in time t1, the voltage value of the output voltage V1 of the mains power supply 4 increases from v11 to v10. At a point in time t2, the voltage value of the output voltage V1 becomes greater than the first voltage threshold value Vth1. The interval between the point in time t1 and the point in time t2 is shorter than the first duration Tth1. Since the duration for which the output voltage V1 remains equal to or less than the first voltage threshold value Vth1 (i.e., the interval between the point in time t1 and the point in time t2) is shorter than the first duration Tth1, the decision unit 32 decides that the first condition should not be satisfied, i.e., the mains power supply 4 should be in good working order. Thus, the output unit 34 does not output the instruction signal to the shift-by-wire system 5. Also, at the point in time t2 when the voltage value of the output voltage V1 becomes greater than the first voltage threshold value Vth1, the timer 33 resets the first count value.

As can be seen, even if the output voltage V1 of the mains power supply 4 has once decreased to the first voltage threshold value Vth1 or less but has increased to the first voltage threshold value Vth1 or more before the first duration Tth1 passes, then a decision is made that the mains power supply 4 should not be out of order. For example, if the voltage value of the output voltage V1 of the mains power supply 4 has temporarily decreased to the first voltage threshold value Vth1 or less when the drive source 7 (i.e., the engine) is restarted after the idling has stopped, then a decision is made that the mains power supply 4 should not be out of order. This reduces the chances of the backup power supply system 1 making a decision erroneously that the mains power supply 4 should be out of order and also reduces the chances of the backup power supply system 1 outputting the instruction signal to the shift-by-wire system 5 by mistake. Thus, this reduces the chances of the shift range of the automatic transmission 6 being changed from the drive range into the parking range accidentally while the vehicle is running (particularly when the vehicle is running at high speeds) even though the mains power supply 4 is actually in good working order.

Also, suppose the voltage value of the output voltage V1 of the mains power supply 4 has decreased from v10 to v12 and then remains equal to v12 for a certain period of time. The voltage value v12 is less than the first voltage threshold value Vth1 but greater than the second voltage threshold value Vth2. At a point in time t3, the voltage value of the output voltage V1 becomes less than the first voltage threshold value Vth1. The timer 33 starts, at the point in time t3, counting to obtain the first count value.

Thereafter, at a point in time t4, the first count value obtained by the timer 33 reaches the first duration Tth1. Thus, the decision unit 32 decides that the first condition should be satisfied and the mains power supply 4 should be out of order. Then, the output unit 34 outputs the instruction signal to the shift-by-wire system 5. On receiving the instruction signal, the shift-by-wire system 5 changes the shift range of the automatic transmission 6 into the parking range. Changing the shift range of the automatic transmission 6 into the parking range allows the vehicle to be brought to a halt.

(3.2) Second Exemplary Operation

Next, a second exemplary operation of the backup power supply system 1 will be described with reference to FIG. 3.

In FIG. 3, at a point in time t10, the mains power supply 4 is in good working order and the voltage value of the output voltage V1 of the mains power supply 4 is v10. The voltage value v10 is greater than the first voltage threshold value Vth1, the second voltage threshold value Vth2, and the voltage value of the output voltage of the discharge circuit 22 (see FIG. 1).

Suppose the voltage value of the output voltage V1 of the mains power supply 4 has decreased from v10 to v13. The voltage value v13 is less than the first voltage threshold value Vth1 and the second voltage threshold value Vth2. At a point in time t11, the voltage value of the output voltage V1 becomes less than the first voltage threshold value Vth1. At a point in time t12, the voltage value of the output voltage V1 becomes less than the second voltage threshold value Vth2. Thus, the timer 33 starts, at the point in time t11, counting to obtain the first count value and also starts, at the point in time t12, counting to obtain the second count value.

In this case, when the voltage value of the output voltage V1 of the mains power supply 4 becomes less than the voltage value of the output voltage of the discharge circuit 22, the output voltage of the discharge circuit 22 is applied to the shift-by-wire system 5. That is to say, the source of supplying power to the shift-by-wire system 5 switches from the mains power supply 4 to the backup power supply system 1 (more specifically, the power storage unit 20 thereof).

Thereafter, at a point in time t13, the second count value obtained by the timer 33 reaches the second duration Tth2. Thus, the decision unit 32 decides that the second condition should be satisfied and the mains power supply 4 should be out of order. Note that at the point in time t13, the first count value obtained by the timer 33 has not reached the first duration Tth1 yet, and therefore, the first condition is not satisfied.

The output unit 34 outputs the instruction signal to the shift-by-wire system 5. On receiving the instruction signal, the shift-by-wire system 5 changes the shift range of the automatic transmission 6 into the parking range. Changing the shift range of the automatic transmission 6 into the parking range allows the vehicle to be brought to a halt.

As can be seen, if the output voltage V1 of the mains power supply 4 has decreased to the second voltage threshold value Vth2 (which is smaller than the first voltage threshold value Vth1) or less, then a decision is made, in the second duration Tth2 shorter than the first duration Tth1, that the mains power supply 4 should be out of order. That is to say, if the voltage value of the output voltage V1 of the mains power supply 4 is equal to or less than the second voltage threshold value Vth2 at or under which the drive source 7 cannot be started, then the backup power supply system 1 decides, in a shorter time than in a situation where the voltage value of the output voltage V1 is equal to or less than the first voltage threshold value Vth1 but equal to or greater than the second voltage threshold value Vth2, that the mains power supply 4 should be out of order. This allows the backup power supply system 1 to output the instruction signal to the shift-by-wire system 5 more quickly to bring the vehicle to a halt.

In addition, if the duration for which the output voltage V1 of the mains power supply 4 remains equal to or less than the second voltage threshold value Vth2 is shorter than the second duration Tth2, then the backup power supply system 1 does not decide that the mains power supply 4 should be out of order. If the measured value of the output voltage V1 of the mains power supply 4 has decreased temporarily to less than the second voltage threshold value Vth2 due to noise, for example, then the backup power supply system 1 does not decide that the mains power supply 4 should be out of order. This reduces the chances of the backup power supply system 1 making an erroneous decision about whether or not the mains power supply 4 should have gone out of order and also reduces the chances of the backup power supply system 1 outputting the instruction signal to the shift-by-wire system 5 by mistake. Thus, this reduces the chances of the shift range of the automatic transmission 6 being changed from the drive range into the parking range accidentally while the vehicle is running, even though the mains power supply 4 is actually in good working order.

(4) Variations

Note that the embodiment described above is only one of various embodiments of the present disclosure and should not be construed as limiting. Rather, the exemplary embodiment described above may be readily modified in various manners depending on a design choice or any other factor without departing from the scope of the present disclosure.

In the embodiment described above, the decision unit 32 is configured to make a decision about whether the mains power supply 4 has gone out of order or not by determining whether or not the first condition and the second condition are satisfied. However, this is only an example of the present disclosure and should not be construed as limiting. Optionally, the decision unit 32 may also determine whether not only the first and second conditions but also a third condition are satisfied or not.

The third condition requires that the duration for which the output voltage V1 of the mains power supply 4 remains equal to or less than a third voltage threshold value should be longer than a third duration. The third voltage threshold value is less than the first voltage threshold value Vth1 and greater than the second voltage threshold value Vth2. The third duration is shorter than the first duration Tth1 and longer than the second duration Tth2.

That is to say, according to this variation, multiple conditions (first to third conditions) are set. The multiple conditions are defined such that as the voltage threshold values (first to third voltage threshold values) decrease, the time threshold values (first to third durations) become shorter. This allows, even if the output voltage V1 of the mains power supply 4 has decreased to a value less than the first voltage threshold value Vth1 and greater than the second voltage threshold value Vth2, a decision to be made, before the first duration Tth1 passes, that the mains power supply 4 should be out of order.

Although three conditions (namely, the first to third conditions) are set as the multiple conditions according to this variation, four or more conditions may be set as well.

(5) Control Program

The backup power supply system 1 includes a computer system. The computer system includes, as major hardware constituent elements, a processor and a memory. The computer system performs the functions of the backup power supply system 1 by making the processor execute a control program for the backup power supply system 1 stored in the memory of the computer system.

Figure 4:
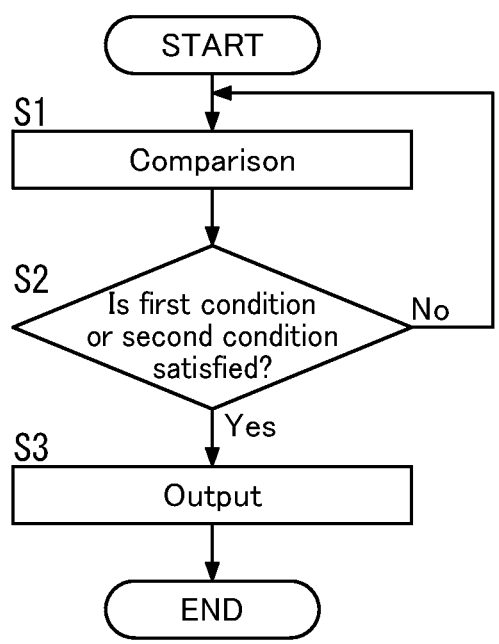
FIG. 4 is a flowchart showing how the backup power supply system for a shift-by-wire system operates.

As shown in FIG. 4, the control program according to this embodiment is designed to cause the computer system (e.g., the control unit 3 in this embodiment) to perform comparison processing S1, decision processing S2, and output processing S3.

The comparison processing S1 includes comparing the voltage value of the output voltage V1 of the mains power supply 4 with the first voltage threshold value Vth1 and the second voltage threshold value Vth2. Also, the comparison processing Si includes comparing, if the voltage value of the output voltage V1 turns out to be equal to or less than the first voltage threshold value Vth1, the duration for which the voltage value of the output voltage V1 remains equal to or less than the first voltage threshold value Vth1 with the first duration Tth1. Furthermore, the comparison processing S1 includes comparing, if the voltage value of the output voltage V1 turns out to be equal to or less than the second voltage threshold value Vth2, the duration for which the voltage value of the output voltage V1 remains equal to or less than the second voltage threshold value Vth2 with the second duration Tth2.

The decision processing S2 includes determining, based on the comparison result obtained by the comparison processing S1, whether or not the first condition or the second condition is satisfied. The first condition requires that the duration for which the voltage value of the output voltage V1 remains equal to or less than the first voltage threshold value Vth1 should be longer than the first duration Tth1. The second condition requires that the duration for which the voltage value of the output voltage V1 remains equal to or less than the second voltage threshold value Vth2 should be longer than the second duration Tth2.

If at least one of the first condition or the second condition is satisfied (i.e., if the answer is YES in S2), the control unit 3 outputs the instruction signal to the shift-by-wire system 5 (output processing S3). On receiving the instruction signal, the shift-by-wire system 5 changes the shift range of the automatic transmission 6 into the parking range.

If neither the first condition nor the second condition is satisfied (i.e., if the answer is NO in S2), the process goes back to the comparison processing S1.

Control of Backup Power Supply System 1

The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very large-scale integrated circuit (VLSI), and an ultra-large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be integrated together in a single device or distributed in multiple devices without limitation.

Resume

A backup power supply system (1) for a shift-by-wire system according to a first aspect includes a power storage unit (20) and a control unit (3). When a mains power supply (4) that supplies power to the shift-by-wire system (5) goes out of order, the power storage unit (20) supplies power to the shift-by-wire system (5). When at least one of a first condition or a second condition is satisfied, the control unit (3) outputs an instruction signal to the shift-by-wire system (5). The instruction signal instructs that a shift range of an automatic transmission (6) should be changed into a parking range. The first condition requires that the duration for which output voltage (V1) of the mains power supply (4) remains equal to or less than a first voltage threshold value (Vth1) should be longer than a first duration (Tth1). The second condition requires that the duration for which the output voltage (V1) of the mains power supply (4) remains equal to or less than a second voltage threshold value (Vth2) should be longer than a second duration (Tth2). The second voltage threshold value (Vth2) is smaller than the first voltage threshold value (Vth1). The second duration (Tth2) is shorter than the first duration (Tth1).

This aspect allows the shift range of the automatic transmission (6) to be changed into the parking range by outputting an instruction signal to the shift-by-wire system (5) when a decision is made that the mains power supply (4) should be out of order. That is to say, the backup power supply system (1) for a shift-by-wire system allows the shift range of the automatic transmission (6) to be changed depending on whether the mains power supply (4) is in good working order or out of order (i.e., working or not working).

In addition, the backup power supply system (1) for a shift-by-wire system also reduces the chances of an instruction signal, instructing that the shift range of the automatic transmission (6) should be changed into a parking range, being output by mistake to the shift-by-wire system (5). Thus, this reduces the chances of the shift range of the automatic transmission (6) being changed from a drive range into the parking range accidentally while the vehicle is running, even though the mains power supply (4) is actually in good working order.

In a backup power supply system (1) for a shift-by-wire system according to a second aspect, which may be implemented in conjunction with the first aspect, the control unit (3) refrains from outputting the instruction signal when the shift range of the automatic transmission (6) is in the parking range.

This aspect allows the processing by the backup power supply system (1) for a shift-by-wire system to be simplified.

In a backup power supply system (1) for a shift-by-wire system according to a third aspect, which may be implemented in conjunction with the first or second aspect, the mains power supply (4) is configured to further supply power to a drive source (7). The first voltage threshold value (Vth1) is greater than a voltage value of the output voltage (V1) of the mains power supply (4) that has decreased when the drive source (7) is started. The second voltage threshold value (Vth2) is a lower limit value of the output voltage (V1) of the mains power supply (4), at or over which the drive source (7) is able to be started.

This aspect reduces the chances of a decision being made erroneously, due to a temporary drop in the output voltage (V1) of the mains power supply (4) when the drive source (7) is started, that the mains power supply (4) should be out of order. In addition, this also allows, when the output voltage (V1) of the mains power supply (4) decreases to less than a lower limit value, a decision to be made, in the second duration (Tth2) shorter than the first duration (Tth1), that the mains power supply (4) should be out of order.

In a backup power supply system (1) for a shift-by-wire system according to a fourth aspect, which may be implemented in conjunction with any one of the first to third aspects, the control unit (3) is configured to, when a third condition is further satisfied, output the instruction signal. The third condition requires that the duration for which the output voltage (V1) of the mains power supply (4) is equal to or less than a third voltage threshold value should be longer than a third duration. The third voltage threshold value is less than the first voltage threshold value (Vth1) and greater than the second voltage threshold value (Vth2). The third duration is shorter than the first duration (Tth1) and longer than the second duration (Tth2).

This aspect allows, even when the output voltage (V1) of the mains power supply (4) decreases to a value less than the first voltage threshold value (Vth1) and greater than the second voltage threshold value (Vth2), a decision to be made, before the first duration (Tth1) passes, that the mains power supply (4) should be out of order.

A backup power supply system (1) for a shift-by-wire system according to a fifth aspect, which may be implemented in conjunction with any one of the first to fourth aspects, further includes a decision unit (32) to determine, based on the output voltage (V1) of the mains power supply (4), whether or not the first condition and the second condition are satisfied.

This aspect allows a decision to be made, by having the decision unit (32) determine whether or not the first condition and the second condition are satisfied, about whether or not the mains power supply (4) is out of order.

A control program according to a sixth aspect is a program for controlling a backup power supply system (1) for a shift-by-wire system. When a mains power supply (4) that supplies power to the shift-by-wire system (5) goes out of order, the backup power supply system (1) supplies power to the shift-by-wire system (5). The control program is designed to cause a computer system to perform output processing. The output processing includes outputting, when at least one of a first condition or a second condition is satisfied, an instruction signal to the shift-by-wire system (5). The instruction signal instructs that a shift range of an automatic transmission (6) should be changed into a parking range. The first condition requires that the duration for which output voltage (V1) of the mains power supply (4) remains equal to or less than a first voltage threshold value (Vth1) should be longer than a first duration (Tth1). The second condition requires that the duration for which the output voltage (V1) of the mains power supply (4) remains equal to or less than a second voltage threshold value (Vth2) should be longer than a second duration (Tth2). The second voltage threshold value (Vth2) is smaller than the first voltage threshold value (Vth1). The second duration (Tth2) is shorter than the first duration (Tth1).

This aspect allows the shift range of the automatic transmission (6) to be changed into the parking range by outputting an instruction signal to the shift-by-wire system (5) when a decision is made that the mains power supply (4) should be out of order. That is to say, this control program allows the shift range of the automatic transmission (6) to be changed depending on whether the mains power supply (4) is in good working order or out of order.

In addition, this control program also reduces the chances of the instruction signal, instructing that the shift range of the automatic transmission (6) should be changed into the parking range, being output by mistake to the shift-by-wire system (5). Thus, this reduces the chances of the shift range of the automatic transmission (6) being changed from a drive range into the parking range accidentally while the vehicle is running, even though the mains power supply (4) is actually in good working order.

REFERENCE SIGNS LIST

1 Backup Power Supply System for Shift-By-Wire System

20 Power Storage Unit
3 Control Unit
32 Decision Unit
4 Mains Power Supply
5 Shift-By-Wire System
6 Automatic Transmission
7 Drive Source
V1 Output Voltage
Vth1 First Voltage Threshold Value
Vth2 Second Voltage Threshold Value
Tth1 First Duration
Tth2 Second Duration

The invention claimed is:

1. A backup power supply system for a shift-by-wire system, the backup power supply system comprising:
   a power storage unit configured to, when a mains power supply that supplies power to the shift-by-wire system goes out of order, supply power to the shift-by-wire system; and
   a control unit configured to, when at least one of a first condition or a second condition is satisfied, output an instruction signal to the shift-by-wire system, the instruction signal instructing that a shift range of an automatic transmission be changed into a parking range,
   the first condition requiring that duration for which output voltage of the mains power supply remains equal to or less than a first voltage threshold value be longer than a first duration,
   the second condition requiring that duration for which the output voltage of the mains power supply remains equal to or less than a second voltage threshold value be longer than a second duration, the second voltage threshold value being smaller than the first voltage threshold value, the second duration being shorter than the first duration.

2. The backup power supply system of claim 1, wherein the control unit is configured to, when the shift range of the automatic transmission is in the parking range, refrain from outputting the instruction signal.

3. The backup power supply system of claim 1, wherein the mains power supply is configured to further supply power to a drive source,
   the first voltage threshold value is greater than a voltage value of the output voltage of the mains power supply that has decreased when the drive source is started, and
   the second voltage threshold value is a lower limit value of the output voltage of the mains power supply, at or over which the drive source is able to be started.

4. The backup power supply system of claim 1, wherein the control unit is configured to, when a third condition is further satisfied, output the instruction signal, and
   the third condition requires that duration for which the output voltage of the mains power supply is equal to or less than a third voltage threshold value be longer than a third duration,
   the third voltage threshold value being less than the first voltage threshold value and greater than the second voltage threshold value,
   the third duration being shorter than the first duration and longer than the second duration.

5. The backup power supply system of claim 1, further comprising a decision unit configured to determine, based on the output voltage of the mains power supply, whether or not the first condition and the second condition are satisfied.

6. A non-transitory storage medium recording a control program for controlling a backup power supply system for a shift-by-wire system, the backup power supply system being configured to, when a mains power supply that supplies power to the shift-by-wire system goes out of order, supply power to the shift-by-wire system,
   the program being designed to cause a computer system to perform output processing of outputting, when at least one of a first condition or a second condition is satisfied, an instruction signal to the shift-by-wire system, the instruction signal instructing that a shift range of an automatic transmission be changed into a parking range,
   the first condition requiring that duration for which output voltage of the mains power supply remains equal to or less than a first voltage threshold value be longer than a first duration,
   the second condition requiring that duration for which the output voltage of the mains power supply remains equal to or less than a second voltage threshold value be longer than a second duration, the second voltage threshold value being smaller than the first voltage threshold value, the second duration being shorter than the first duration.

7. The backup power supply system of claim 3, wherein the control unit is configured to, when a third condition is further satisfied, output the instruction signal, and
   the third condition requires that duration for which the output voltage of the mains power supply is equal to or less than a third voltage threshold value be longer than a third duration,
   the third voltage threshold value being less than the first voltage threshold value and greater than the second voltage threshold value,
   the third duration being shorter than the first duration and longer than the second duration.

* * * * *